United States Patent [19]

Polvani

[11] Patent Number: 5,444,669
[45] Date of Patent: Aug. 22, 1995

[54] MAGNETIC RELATIVE POSITION MEASURING SYSTEM

[75] Inventor: Donald G. Polvani, Arnold, Md.

[73] Assignee: Westinghouse Electric Corporation, Pittsburgh, Pa.

[21] Appl. No.: 625,241

[22] Filed: Dec. 10, 1990

[51] Int. Cl.$^6$ ............................................. F41F 5/00
[52] U.S. Cl. ................................ 367/96; 367/128; 114/21.3
[58] Field of Search .................. 364/516, 517, 578; 367/96, 128; 114/21.3

[56] References Cited

U.S. PATENT DOCUMENTS 5,012,717  5/1991  Metersky et al. ................... 114/21.3

OTHER PUBLICATIONS

Francis Scheid, "Schaum's Outline Of Theory and Problems of Numerical Analysis", 1968, Chap. 28, pp. 375–381.
Jorge J. Moré et al, "User Guide For Minpack-1", Argonne National Laboratory, ANL-80-74, Aug. 1980, pp. 3–15.
Math CAD 2.0 Reference Manual, Mathsoft, Inc., 1987, pp. 273, 274.
W. H. Press et al, "Numerical Recipes" (The Art of Scientific Computing), Cambridge University Press (1989), pp. 523–526.

*Primary Examiner*—Salvatore Cangialosi

[57] ABSTRACT

A torpedo relative position measuring system, including an active sonar system and a passive magnetic system, is coupled to computing apparatus which operates in response to a set of stored computer programs, all located in the torpedo for homing in on a ferrous target. At long ranges and mid ranges, the torpedo is directed to the target by the sonar system, while at near ranges the magnetic system determines the x, y, z, relative position coordinates between the target and the torpedo in accordance with a calibrated stored magnetic model of the target and numerical solution of the non-linear equations linking the target's magnetic field, as measured at the torpedo, with the target's relative position. Guidance information derived therefrom is then fed to the torpedo's guidance system. With the magnetic system providing the relative position of the target at close range, the torpedo's normal guidance system can readily steer the torpedo to a desired hit point on the target.

16 Claims, 4 Drawing Sheets

MAGNETIC RELATIVE POSITION MEASURING SYSTEM

BACKGROUND OF THE INVENTION

This invention relates generally to position measuring systems utilizing magnetic sensors and more particularly to a system for determining the relative position between a naval torpedo and a ferrous target and thereafter homing in on the target.

An accurate torpedo hit is now essential for modern surface ships and submarines due to recent improvements in ship construction techniques. For example, it is usually desirable for the torpedo to strike the target near its center rather than at the bow or stern so as to cause maximum damage.

Modern torpedoes typically use sonar systems to provide target relative position data for their guidance systems. At medium to long ranges, e.g. greater than 150 to 500 m, such systems are very effective. However, at near ranges, e.g. less than 150 m, target position data from sonar systems may be subject to serious errors for the following reasons. First, for an active sonar system, the transmitted and received pulses may interfere with each other due to the close proximity of the target. For a transmitted pulsewidth of 0.2 sec, for example, this presents a problem at approximately 150 m from the target since an acoustic pulse propagating at a nominal speed of 1500 m/sec in sea water takes 0.2 sec to travel the 300 m round trip to and from the target. Secondly, at near ranges, i.e. when the range is equal to or smaller than the target's maximum dimension, as can happen for typical targets at 150 m, acoustic targets typically break up into a number of spatially discrete acoustic "highlights". The torpedo is now faced with a choice of which highlight to home in on. Thus, bow and/or stern highlights can cause a torpedo to deviate from an effective central hit.

Accordingly, it is an object of the present invention, therefore, to provide an improvement in systems for providing target relative position data for an ordnance guidance system.

It is another object of the invention to provide an improved system for determining the relative position between a torpedo and a naval vessel.

It is a further object of the invention to provide a magnetic system for determining the relative position between a naval torpedo and a ferrous target for guiding the torpedo to the target at near ranges.

SUMMARY

Briefly, the foregoing and other objects are achieved by means of an on-board torpedo relative position measuring system comprised of a torpedo active sonar system and a passive magnetic system, both coupled to computing apparatus which operates in response to a set of stored computer programs, to provide target relative position data to the torpedo's guidance system. At long ranges and mid-ranges, the torpedo is directed to the target by the sonar system. During the mid-range portion of the torpedo's trajectory, the magnetic system calibrates the magnetic moments of a stored magnetic model of the target using the sonar system for target position and orientation. At near ranges, the magnetic system determines the relative position coordinates between the target and the torpedo in accordance with the calibrated target magnetic model and an iterative numerical algorithm which generates guidance information. This information is then fed to the torpedo guidance system. Conventional active sonar systems have an inherent deficiency due to potential interference between the transmitted and received acoustic pulses at close ranges and the break up of the target's acoustic signature into separate acoustic highlights. With a magnetic system providing accurate target relative position at close range, a conventional torpedo guidance system can readily steer the torpedo to a desired hit point, e.g. mid-ships.

BRIEF DESCRIPTION OF THE DRAWINGS

The following detailed description will be more readily understood when considered together with the following drawings in which.

DETAILED DESCRIPTION OF THE INVENTION

Figure 1:
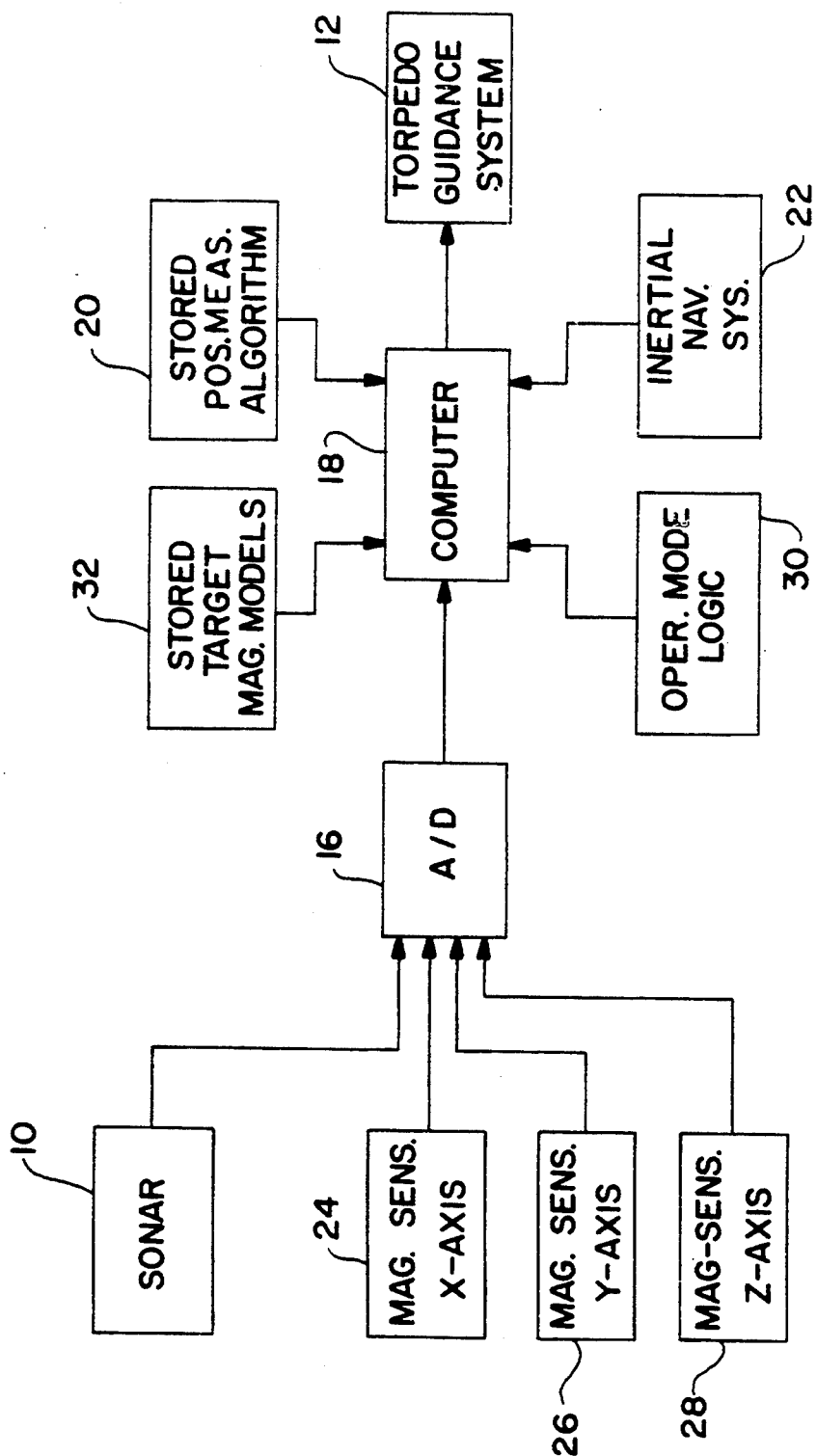
FIG. 1 is an electrical block diagram illustrative of a torpedo guidance system in accordance with the preferred embodiment of the invention.

Referring now to the drawings and more particular to FIG. 1, shown thereat is an electrical block diagram of apparatus included in the body of a naval torpedo, not shown. Reference numeral 10 denotes a conventional sonar subsystem which is used to provide target relative position information for the torpedo's guidance system, both at long ranges, 500 meters (m) or more, and mid-ranges, 500 to 150 m. The sonar data is first converted from analog to digital form by an analog to digital converter 16 and is processed by a signal processor, such as a digital computer 18, which operates in accordance with stored computer position measurement algorithms 20. These algorithms process the input data, solve linear and non-linear systems of simultaneous equations by least squares techniques, and transform coordinate systems. The operation of these algorithms is controlled by the stored operating mode logic 30. The computer 18, for example, operates to average data from several sonar "pings" before outputting guidance signals to the torpedo guidance system 12. For target ranges between 150 and 500 m, the sonar's data is used by the computer 18 to estimate the target's position relative to the torpedo and the target's orientation with respect to three orthogonal (x, y, z) axes which are predefined and set in the torpedo. The target's x, y, z coordinates are calculated in the computer 18 from conventional sonar spherical coordinate measurements of target range (r) depression angle (D), and azimuth angle (A) using the following well known relations between Cartesian and spherical coordinates:

$$x = r \sin(D) \cos(A) \quad (1)$$

$$y = r \sin(D) \sin(A) \quad (2)$$

$$z = r \cos(D) \quad (3)$$

The target's orientation with respect to the torpedo's x, y, z, axes can be obtained in several ways; however, each of these methods assumes that the target has zero (or small) roll and pitch angles. One method is to measure the temporal elongation of the sonar's transmitted pulse as observed in the return echo from the target. This elongation is directly related to the target's orientation relative to the torpedo. A target whose keel is broadside to the sonar's beam will have minimum elongation, while a target whose keel line lies along the sonar's beam will have maximum pulse elongation. Thus, a measure of received pulse elongation can be used to determine the target's orientation with respect to the torpedo's sonar beam. Since the spatial relationship between the sonar's beam and the torpedo's axes is known, the target's orientation with respect to the torpedo's axes can also be determined. Averaging these determinations over several pulses will improve accuracy of the estimate. The computer 18 is also coupled to a conventional inertial navigation system 22. The inertial navigation system 22 provides the torpedo's position and orientation with respect to an inertial set of axes, i.e. axes fixed in space. The target's orientation with respect to the inertial axes can then be derived in a well known manner from knowledge of the target's orientation with respect to the torpedo's axes.

A second method of determining the target's orientation is to determine the three dimensional track of the target as measured by a series of sonar return echoes. In this method, sonar measurements of the target's position relative to the torpedo are transformed into inertial space and used to determine the target's track in inertial space. The target's keel is assumed to lie along the measured track, and the target is assumed to be making forward motion along its track to resolve the 180 degree ambiguity between positions of the bow and the stern.

Further, as shown in FIG. 1, three orthogonal "vector" magnetometers 24, 26 and 28 are aligned along the torpedo's x, y, z axes, and operate to continuously measure the three orthogonal components $B_x$, $B_y$, $B_z$, of the magnetic induction field of a ferrous target 14 and input these measurements via the A/D converter 16 to the digital computer 18. The magnetometers 24, 26, 28 typically comprise fluxgate type magnetometers. Such devices are well known and are able to measure the required three orthogonal spatial components of the magnetic induction field and offer adequate signal sensitivity.

The inertial navigation system 22, as noted, provides the position and angular orientation of the torpedo's axes with respect to an arbitrarily chosen set of axes fixed in inertial space. Knowing the angular orientation between these sets of axes, conventional techniques are used to transform the components of the magnetic induction field vector $B_x$, $B_y$, $B_z$, and the x, y, z components of the target's relative distance from the torpedo's axes to the inertial space axes. These transformation techniques are well known and are described, for example, in standard classical mechanics textbooks, a typical example being *Classical Mechanics*, H. Goldstein, Addison-Wesley, Reading, Mass., 1959, Chapter 4.

The magnetic induction and the target's relative distance components are now transformed to a set of axes fixed in the target. This is accomplished using the same transformation techniques described above. All information necessary to relate the target's axes to the inertial axes is available since: (1) The target is assumed to have zero roll and pitch; and (2) Determination of the target's orientation with respect to the inertial axes, as determined above, provides the remaining angular information needed to perform the transformation.

Figure 2:
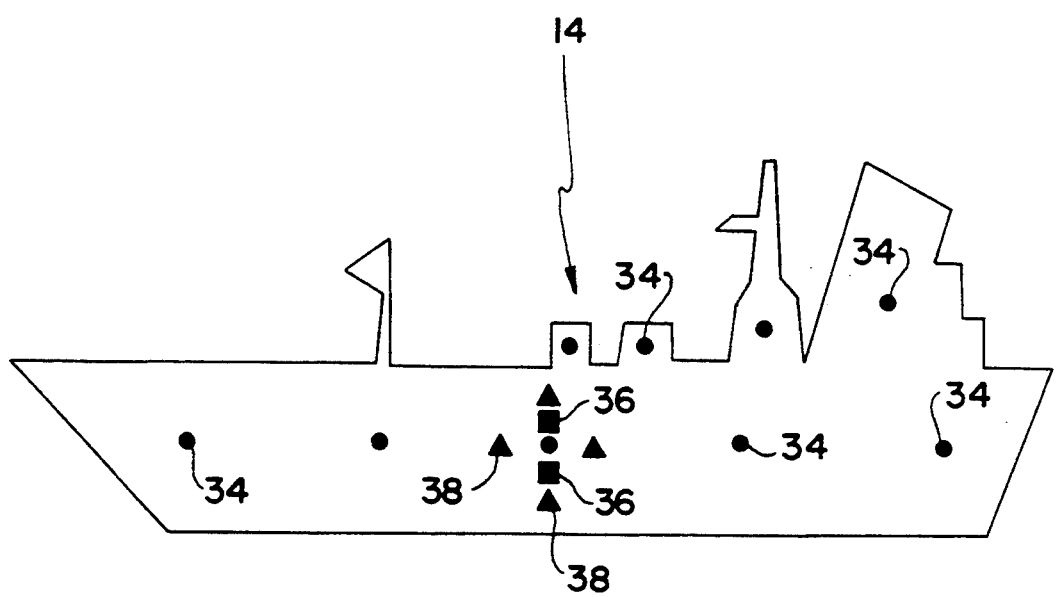
FIG. 2 is an outline of a naval vessel including, for illustration purposes only, arbitrary locations of dipole, quadrupole, and octupole or higher order magnetic moments.

Additionally, models of various target specific magnetic sources, such as the hypothetical example shown in FIG. 2, are stored in a memory 32 associated with and forming an integral part of the digital computer 18. A target magnetic model, as shown in FIG. 2, for the vessel 14 may include, for example, a plurality of magnetic dipoles 34, a plurality of magnetic quadrupoles 36 and a plurality of magnetic octupoles, or higher order sources 38 along with their relative positions on the target. The numerical values of the magnetic moment components, which completely characterize these magnetic sources, are not stored initially in the computer memory 32. The needed values of the magnetic moments are obtained by taking many sets of magnetic measurements with the sensors 24, 26, and 28 as well as using the sonar information obtained from the sonar apparatus 10 and solving by least squares techniques a set of overdetermined linear equations to be subsequently described. For a simple single dipole type target, this consists only of determining the values $M_x$, $M_y$, $M_z$, which comprise the x, y, z components of the dipoles magnetic moment M. For more complicated models, such as shown in FIG. 2, moment component values for all the dipoles, quadrupoles or higher order poles present are determined. At near ranges, i.e., less than 150 m, magnetic field values from the magnetic sensors 24, 26 and 28 are combined with a calibrated model, to be hereinafter described, by the computer 18 to determine the position coordinates of the center of the target 14 relative to the torpedo using an iterative numerical procedure for non-linear equations, such as the well accepted Levenberg-Marquardt method, the details of which are disclosed in publication *ANL*-80-74 by J. J. More et al, Argonne National Laboratory, Aug. 1980. The x, y, z coordinates of the target's center so determined are fed to the torpedo's guidance system 12 so that appropriate steering commands can be generated to cause the torpedo to strike the center of the target 14 or any desired horizontal or vertical offset from the center thereof.

Figure 3:
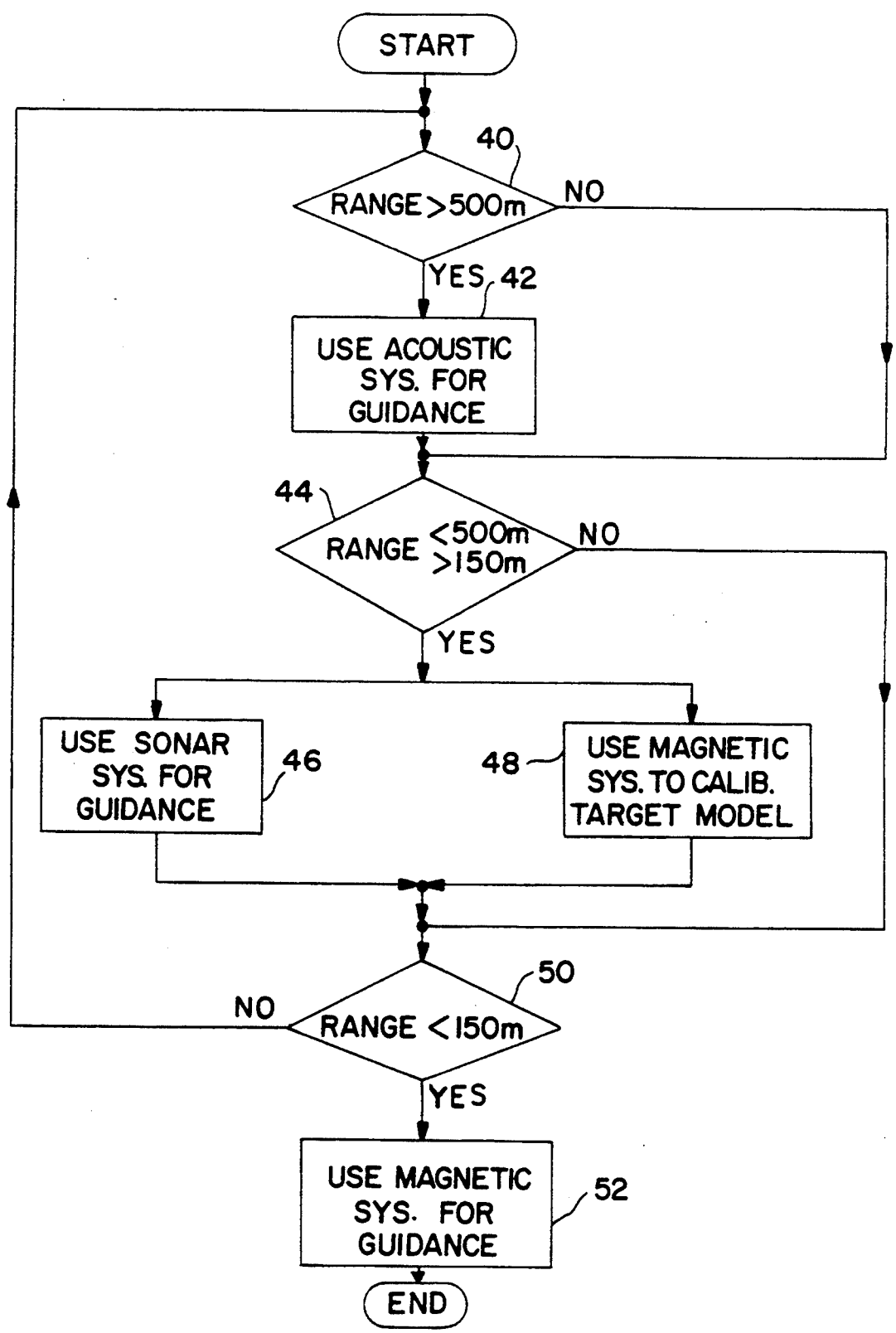
FIG. 3 is a flow chart generally illustrative of the functional sequence of operation of the system shown in FIG. 1.

Referring now to FIG. 3, shown thereat is a functional flow chart illustrative of the operation of the system shown in FIG. 1. At long ranges as indicated by reference numeral 40, e.g. beyond 500 m, the sonar apparatus 10 provides guidance data for the torpedo shown by reference numeral 42. This constitutes well known prior art practice. The magnetic system including the magnetometers 24, 26 and 28 at this time is held in an inactive but ready state.

At mid-ranges from the target, e.g., from 500 to 150 m, as shown by reference numeral 44, the sonar system continues to provide guidance data to the torpedo as shown by the step 46, but now additionally, as shown by step 48, the magnetic system combines the sonar system's target relative position and orientation information with measurement of the target's three magnetic induction field components $B_x$, $B_y$ and $B_z$ to calibrate the magnetic moments of a previously stored magnetic model of the target. This has been referred to briefly above.

A target magnetic model, for example, is shown in Figure 2 and is comprised of a plurality of spatially discreet magnetic sources which include dipoles 34, quadrupoles 36, and octupoles or higher order poles 38, as shown in FIG. 2. These multipole sources of magnetic field form the magnetic "highlights" and are well understood in electromagnetic theory as is discussed, for example, in the text entitled *Classical Electrodynamics*, D. Jackson, John E. Wiley & Sons, 1962. Calibration of the target's magnetic model consists in solving for the multipole moments which completely categorize the magnetic sources used to make-up the model. The relative positions of the multipole moments are assumed to be known from prior efforts at magnetically modelling ships.

At near ranges from the target 14, e.g. less than 150 m, as shown by reference numeral 50, the magnetic system is used to determine relative position to the target magnetic model as shown by step 52. For convenience, the torpedo may aim at the physical center of the target 14, but the target aim point is arbitrary. The sonar system is now in a ready state but is no longer providing target relative position data to the torpedo's guidance system. This is provided by the magnetic system now using the calibrated target model plus the continuing measurements of $B_x$, $B_y$, $B_z$ together with a numerical algorithm to solve for the x, y, z relative distances between the desired aim point on the target and the torpedo. This procedure will now be described.

With respect to the step 48 of calibrating the target model, for simplicity one can consider a target model consisting of a single magnetic dipole at the center of the target, for example, a simplification of the vessel 14 shown in FIG. 2 which contains only a single dipole at its center. This simple model is presented for the purposes of illustration only since the concept of a multipole expansion of a magnetic source is easily extended to an arbitrary number of dipoles and higher order multipoles spatially distributed over the target and is taught by the aforementioned publication, *Classical Electrodynamics*. The magnetic induction field from a static magnetic dipole has three spatial components which can be expressed, in SI units, as:

$$B_x = \mu_0/4\pi\{3(M \cdot r)x/r^5 - M_x/r^3\} \quad (4)$$

$$B_y = \mu_0/4\pi\{3(M \cdot r)y/r^5 - M_y/r^3\} \quad (5)$$

$$B_z = \mu_0/4\pi\{3(M \cdot r)z/r^5 - M_z/r^3\} \quad (6)$$

where x, y, z are the distances of the observation point from the dipole's center and $$r = (x^2 + y^2 + z^2)^{\frac{1}{2}} \quad (7)$$

and $$M \cdot r = M_x x + M_y y + M_z z \quad (8)$$

with $M_x$, $M_y$, $M_z$ comprising the x, y, z components of the dipole's magnetic moment $\overline{M}$.

To calibrate the model for this dipole, the magnetic moment components $M_x$, $M_y$, $M_z$ are computed, given the measured valves of $B_x$, $B_y$, $B_z$ which are received from the magnetometers 24, 26 and 28 and the measured values of x, y, z as derived from the data generated by the sonar apparatus 10.

Equations (4)–(6) are linear with respect to the moment components and are easily rearranged to yield:

$$(3x^2/r^5 - 1/r^3)M_x + (3xy/r^5)M_y + (3xz/r^5)M_z = 4\pi/\mu_0 B_x \quad (9)$$

$$(3xy/r^5)M_x + (3y^2/r^5 - 1/r^3)M_y + (3yz/r^5)M_z = 4\pi/\mu_0 B_y \quad (10)$$

$$(3xz/r^5)M_x + (3yz/r^5)M_y + (3z^2/r^5 - 1/r^3)M_z = 4\pi/\mu_0 B_z \quad (11)$$

Equations (9)–(11) are three linear equations in $M_x$, $M_y$, $M_z$ and can, in principle, be solved exactly given one set of exact values of x, y, z and $B_x$, $B_y$, $B_z$. However, the sonar apparatus 10 and the magnetic sensors 24, 26, and 28 usually include errors in their measurements. Fortunately, they also make more than just one set of measurement during the torpedo's run toward the target. Accordingly, many sets of measured values x, y, z and $B_x$, $B_y$, $B_z$, are used to determine average values of $M_x$, $M_y$, $M_z$. This is accomplished by considering equations (9)–(11) as an "overdetermined" set of equations, a term well known to those skilled in the art of mathematical analysis. This means there are more equations than there are unknowns due to the many extra sets of sonar and magnetic data available, all of which must satisfy Equations (9)–(11). Solutions are then found for $M_x$, $M_y$, $M_z$, which minimize, in accordance with a well accepted criterion, the error in estimation. There are a number of well known techniques for accomplishing this purpose; however, the technique preferred is the least squares solution for overdetermined systems of equations. This procedure is described, for example, in standard textbooks on the subject, one example being *Numerical Analysis*, Francis Scheid, Schaum's Outline Series, McGraw-Hill, New York, 1968.

Once $M_x$, $M_y$, $M_z$ have been determined, the target's magnetic model of the target, e.g. the vessel 14, is completely calibrated. This means that given an observation point at x, y, z, the magnetic induction components $B_x$, $B_y$, $B_z$ can be determined, or, in the present case, given measured values of $B_x$, $B_y$, $B_z$, the observation point distances x, y, z from the magnetic moment can be determined. For more complicated models than a single dipole at the target's center, the relative position of each magnetic source, with respect to the target's center, is prespecified and stored in the memory 32 (FIG. 1). Moments for the more complicated model are also determined by a set of overdetermined linear equations similar to equations (9)–(11). Evaluation of the model's moments along with their prespecified relative positions completely defines the magnetic model of such sources.

Considering now the near range mode as shown by step 52 in FIG. 3, which is the heart of this invention, the torpedo's computer 18 (FIG. 1) solves equations (4)–(6) for x, y, z using the calibrated moment values of the target and the measured values of $B_x$, $B_y$, $B_z$ from the magnetometers 24, 26 and 28. Since these equations are nonlinear in x, y, z, the Levenberg-Marquardt method referred to above is used to iteratively determine approximate solutions.

Figure 4:
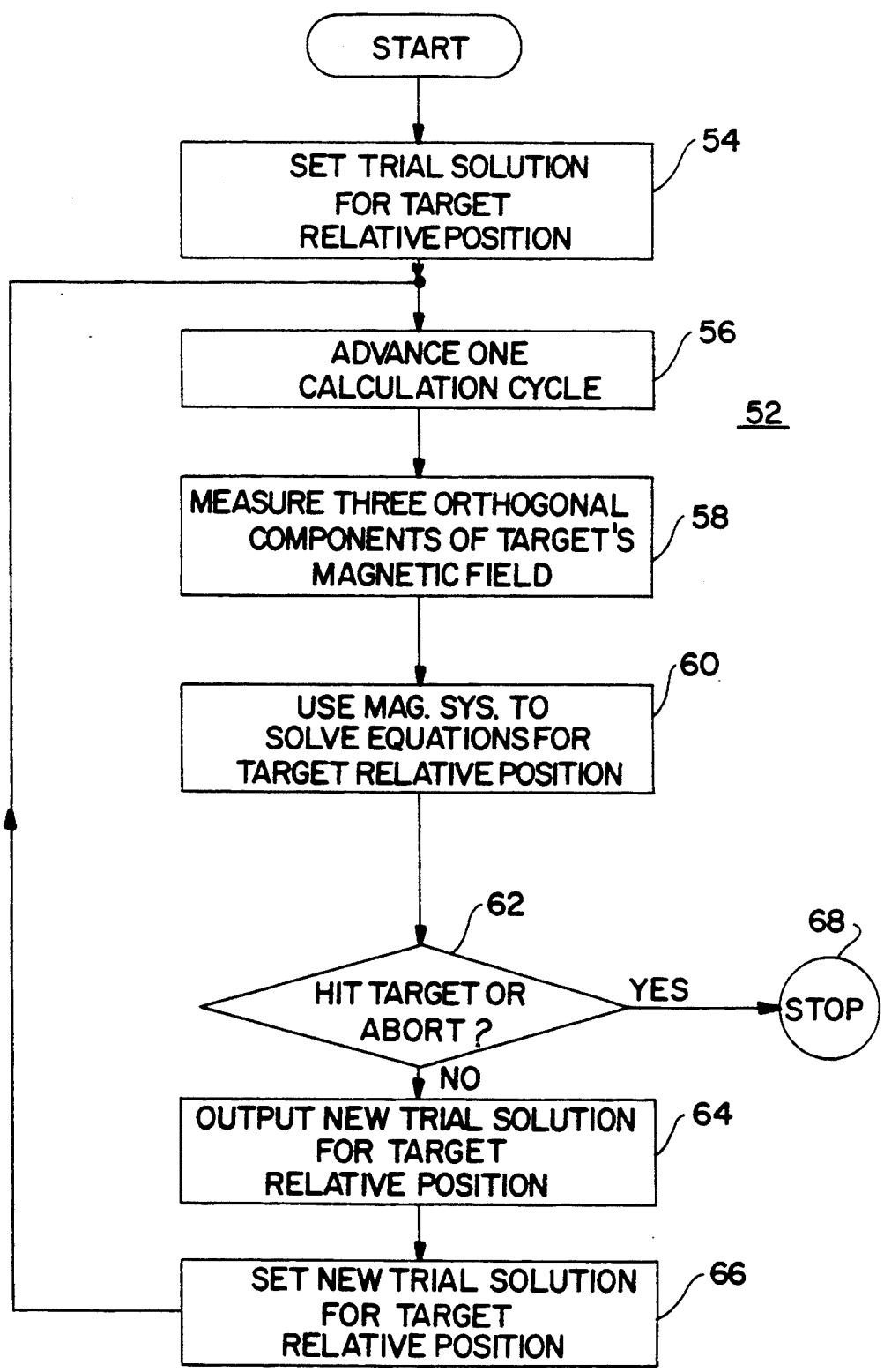
FIG. 4 is a flow chart further illustrative of the functional sequence shown in FIG. 3 at close range.

Referring now to FIG. 4 there is shown a flow diagram for the near-range mode. To start the numerical method, an initial trial solution is entered, as shown by step 54, where values derived from the data generated by the sonar 10 are used for a first trial solution of x, y, z just at the start at the near-range phase, e.g., 150 m. The torpedo advances one calculation cycle as shown by step 56 and the magnetic sensors 24, 26 and 28 measure three orthogonal components of the target's magnetic induction field as shown by step 58. The magnetic system next solves the simultaneous, nonlinear equations for the target's relative position using the trial solution obtained by step 54, the magnetic sensor data provided by the magnetometers 24, 26 and 28 and the calibrated magnetic model obtained in step 48 of FIG. 3. The numerical Levenberg-Marquardt algorithm iterates solutions until values of x, y, z are determined which minimize its least squares error criterion.

During the time in which the computer 18 (FIG. 1) has performed these calculations, the torpedo has advanced towards the target 14 as evidenced by the steps 62 and 64 in FIG. 4. The values just obtained for x, y, z are now used as a new trial solution in another numerical search for updated values. This is evidenced by step 66. The process continues in an iterative loop with each numerical solution becoming the trial solution for the next numerical solution. This technique is both efficient and accurate since the initial trial solutions are very close to the final numerical solution due to the short time which occurs between successive calculations and, therefore, the short distance which can be traveled by the torpedo between calculations. For example, the first trial solution as provided by the sonar apparatus 10 is not very far off from being correct immediately at the start of the near-range region where the magnetic system takes over. This means the first numerical solution is arrived at quickly and relatively accurately. This numerical solution then becomes the trial solution for the next numerical solution. Because the torpedo has not moved any significant distance during the computer's calculation cycle, the trial solution is close to the final numerical solution. This means the numerical search for the final solution requires few iterations and proceeds quickly. This process is continued until the torpedo reaches its target or its mission is aborted as evidenced by reference numeral 68.

Accordingly, what has been shown and described therefore is a relative position measuring system which involves both an active and passive means for determining the torpedo's position with respect to a target, with an active system which comprises a sonar type apparatus being used at far and mid-range distances while a passive magnetic system is used at near-ranges to steer the torpedo to its desired hit point.

Having thus shown and described what is at present considered to be the preferred method and apparatus for implementing the invention it should be known that the same has been made by way of illustration and limitation. Accordingly, all modifications, alterations and changes within the spirit and scope of the invention as defined in the appended claims are herein meant to be included.

I claim:

1. A method for guiding a torpedo to a target at relatively near ranges where the torpedo includes both an active sonar system, a passive magnetic target detection system, an A/D converter, a digital computer, an inertial navigation system, and a guidance system which is responsive to signals generated by the active sonar system and passive magnetic target detection system, comprising the steps of:

(a) initially determining the position of the target relative to the torpedo utilizing data generated by the active sonar system;

(b) measuring magnetic field components of the target by said passive magnetic target detection system;

(c) calibrating a stored magnetic model of the target utilizing the results of step (a), the orientation angle of the target as determined by the active sonar system, and said magnetic field components;

(d) determining the relative position of the target to the torpedo by the magnetic target detecting system utilizing the results of step (a), as an initial trial solution the magnetic field components measured in step (b), and the magnetic model calibrated in step (c);

(e) generating and coupling guidance signals to the torpedo's guidance system as a function of relative position; and (f) repetitively updating the relative position determination of the target in a succession of steps (d) using as a new trial solution the immediately preceding solution of relative position until the torpedo hits the target or aborts its mission.

2. The method as defined by claim 1 where the step (d) of determining relative position comprises iteratively solving a set of simultaneous, non-linear equations which link the target's magnetic field, as measured at the torpedo, with its relative position to the torpedo.

3. The method as defined by claim 2 wherein said solution comprises determining relative distance values using an algorithm implementing the least squares error criterion.

4. The method as defined by claim 2 wherein said solution comprises determining relative distance values using the Levenberg-Marquardt method of solving non-linear equations.

5. A method of guiding a naval ordnance device to a target, comprising the steps of:

(A) at a relatively long range from the target,
  (a) generating relative position data with respect to the target at said device by means of an active on-board target detection system and generating first guidance signals;
  (b) coupling said first guidance signals to a guidance system on said device;

(B) at a relatively medium from the target,
  (c) repeating steps (a)-(b) and additionally determining the orientation angle of the target using the active on-board target detection system and coupling data of said relative position and orientation to a passive on-board target detection system;
  (d) measuring three mutually orthogonal components of the magnetic induction field of the target by said passive system;
  (e) calibrating a stored magnetic model of the target by said passive system using said data of said relative position and orientation of said target in step (c) and the orthogonal magnetic field components measured in step (d); and (C) at a relatively near range from the target,
  (f) repeating step (d) and determining the relative position of the target by said passive detection system from said three orthogonal components of the target's magnetic field, the calibrated model of the target, and an initial relative position trial solution from the active onboard target detection system;
  (g) generating second guidance signals by said passive target detection system; and
  (h) coupling said second guidance signals to said guidance system.

6. The method of claim 5, wherein said active target detection system comprises a sonar system and wherein said passive target detection system comprises a magnetic sensor system.

7. The method of claim 6 and wherein said magnetic system includes at least three magnetic sensors for measuring the magnetic field of said target along three mutually perpendicular axes.

8. The method of claim 7 wherein said step (e) of calibrating said stored model further comprises determining all the moment components of the magnetic multipoles making up the target's magnetic model from the three orthogonal components of the magnet field measured in step (d) and distance and orientation measurements made by said sonar system with respect to said three mutually perpendicular axes.

9. The method of claim 8 wherein said step of determining the moment components of the magnetic multipoles includes determining the average value of said moment components from plural sets of measured values of the components of the magnetic induction field and plural sets of said distance and orientation measurements.

10. The method of claim 9 wherein said step of determining the moment components of the magnetic multipoles from said plural sets of measured values of both magnetic induction field and distance and orientation includes determining the moment components by the least squares solution for overdetermined linear systems of equations.

11. The method of claim 6 wherein said step (f) of determining the relative position of the target comprises determining new relative distances along three mutually perpendicular (x, y, z) axes by utilizing said moment components of the magnetic multipoles making up the target's magnetic model and three newly measured components of the magnetic field of the target.

12. The method of claim 11 wherein said new relative distances are obtained by solving a set of simultaneous, non-linear equations by an iterative least squares solution which provides distance values along the x, y and z axes.

13. The method of claim 12 wherein said least squares solution comprises the Levenberg-Marquardt algorithm for solving non-linear equations.

14. Apparatus for guiding a naval ordinance device to a target, comprising:
(a) an active target detection system including means for generating acoustic data signals of said target at relatively long and medium ranges from the target;
(b) means responsive to said acoustic data signals for generating signals of the relative position and orientation of the target;
(c) means for generating first guidance signals in response to said relative position and orientation signals;
(d) means for coupling guidance signals including said first guidance signals to a guidance system of said device;
(e) a passive target detection system including magnetic sensor means for measuring and generating signals of three mutually orthogonal components of the magnetic induction field of the target at said medium and at relatively near ranges from said target;
(f) means for storing a magnetic model of at least one said target;
(g) means for calibrating said stored magnetic model by said signals of the relative position and orientation of said target and said signals of the orthogonal components of the magnetic induction field of the target;
(h) means for generating signals of a new relative position of the target in response to said signals of three orthogonal components of the target's magnetic induction field and said calibrated model of the target; and
(i) means for generating second guidance signals by said passive target detection system in response to said signals of a new relative position,
(j) said second guidance signals being coupled to said means for coupling guidance signals to said guidance system.

15. The apparatus of claim 14 wherein said means for calibrating also includes digital computer means.

16. The apparatus of claim 14 wherein said naval ordnance device comprises a torpedo.

* * * * *